Feb. 25, 1969   J. D. ROSS   3,429,585
VARIABLE HEIGHT TRAILER UNIT
Filed March 30, 1967

INVENTOR.
John D. Ross
BY
E. J. Biskup
ATTORNEY

INVENTOR.
John D. Ross
BY
E. J. Biskup
ATTORNEY

INVENTOR.
John D. Ross
BY
E. J. Biskup
ATTORNEY

United States Patent Office 3,429,585
Patented Feb. 25, 1969

3,429,585
VARIABLE HEIGHT TRAILER UNIT
John D. Ross, Nottingham, England, assignor to General Motors Corporation, Detroit, Mich., a corporation of Delaware
Filed Mar. 30, 1967, Ser. No. 626,991
U.S. Cl. 280—423                                9 Claims
Int. Cl. B62d 53/06; B60p 1/34

ABSTRACT OF THE DISCLOSURE

A suspension unit that includes a foldable scissor-type mechanism supporting a walking beam and having an extensible actuator which has a portion thereof restrained from all movement other than along a vertical axis so that the suspension unit is prevented from folding in any manner other than a vertical direction and permits a rocking action of the walking beam for purposes of traversing irregular terrain.

---

The present invention finds particular applicability, although not exclusively, with a cargo trailer of the type usually drawn by a tractor vehicle. Frequently, a cargo vehicle of this type is used not only as a conventional highway semitrailer, but also for coordinated rail, sea, and air transport. In such cases, it is important to have a suspension system for the trailer that provides for lowering the body structure so the latter can be either accommodated by the transporter or for efficient utilization of the available space. In addition, it is important also that the suspension system be such that the trailer unit maintain a constant level attitude while traversing rough terrain and while climbing or descending loading ramps.

Accordingly, the principal object of this invention is to provide a unique walking beam type suspension unit for a trailer that is selectively adjustable in height so as to lower or raise the portion of the trailer it supports.

Another object of the present invention is to provide a variable height suspension unit for a trailer that has a wheeled walking beam including means connecting the walking beam to the trailer and providing for vertical height adjustment thereof to an infinite number of positions between set limits as well as oscillatory movement of the walking beam about a transverse horizontal axis.

A further object of this invention is to provide a height adjustable suspension system for a walking beam which supports a wheeled axle for oscillatory movement about mutually perpendicular axes.

Other objects and advantages of the present invention will be more readily apparent from the following detailed description when taken with the accompanying drawings in which.

Figure 1:
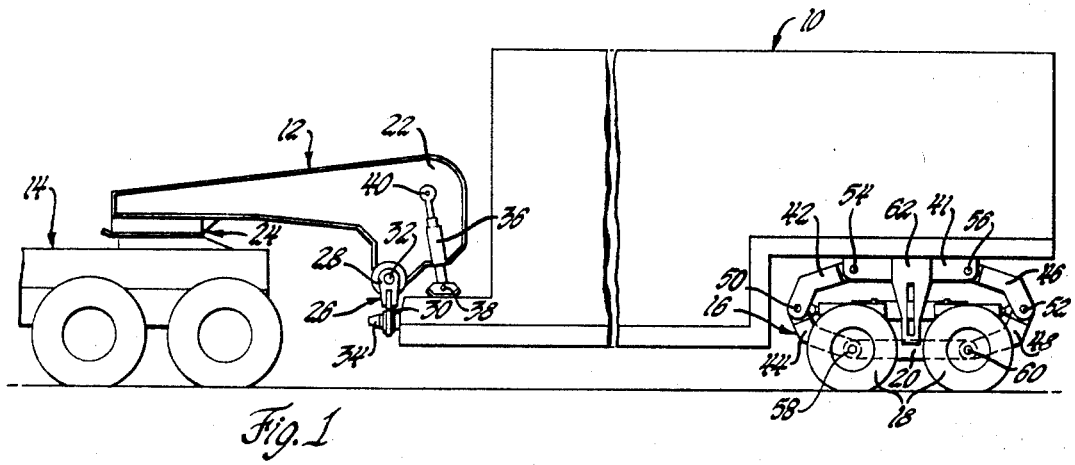
FIGURE 1 shows a trailer unit incorporating a suspension device made in accordance with the invention.
Figure 2:
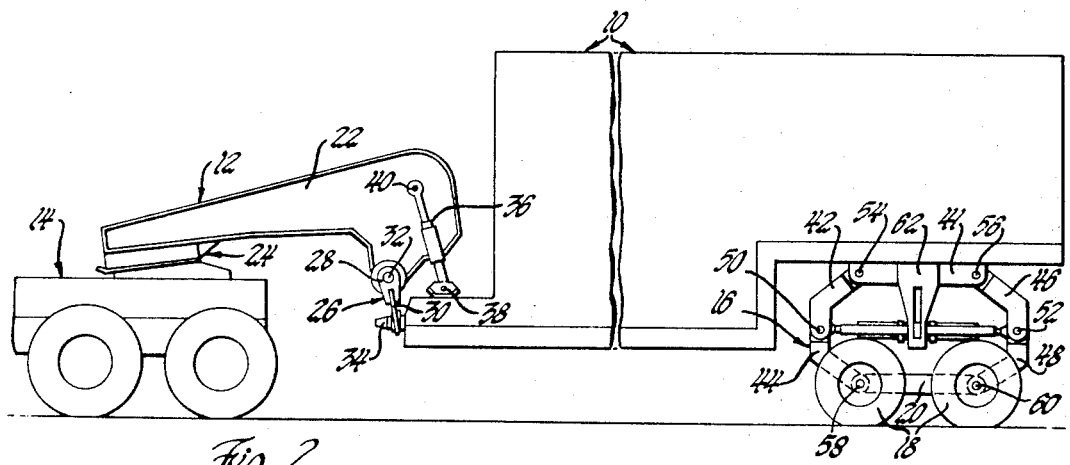
FIGURE 2 is a view similar to FIGURE 1 with the suspension unit in the expanded position for elevating the trailer.
Figure 3:
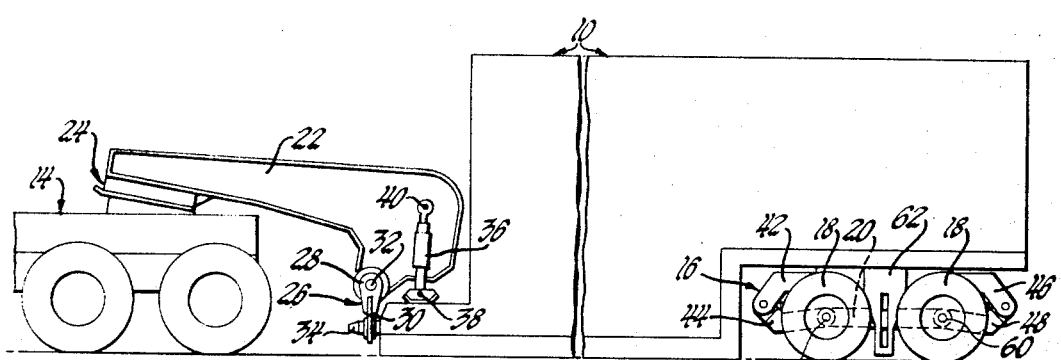
FIGURE 3 is a view similar to FIGURE 1 and shows the suspension unit in a contracted or folded position wherein the trailer is lowered to ground level.
Figure 4:
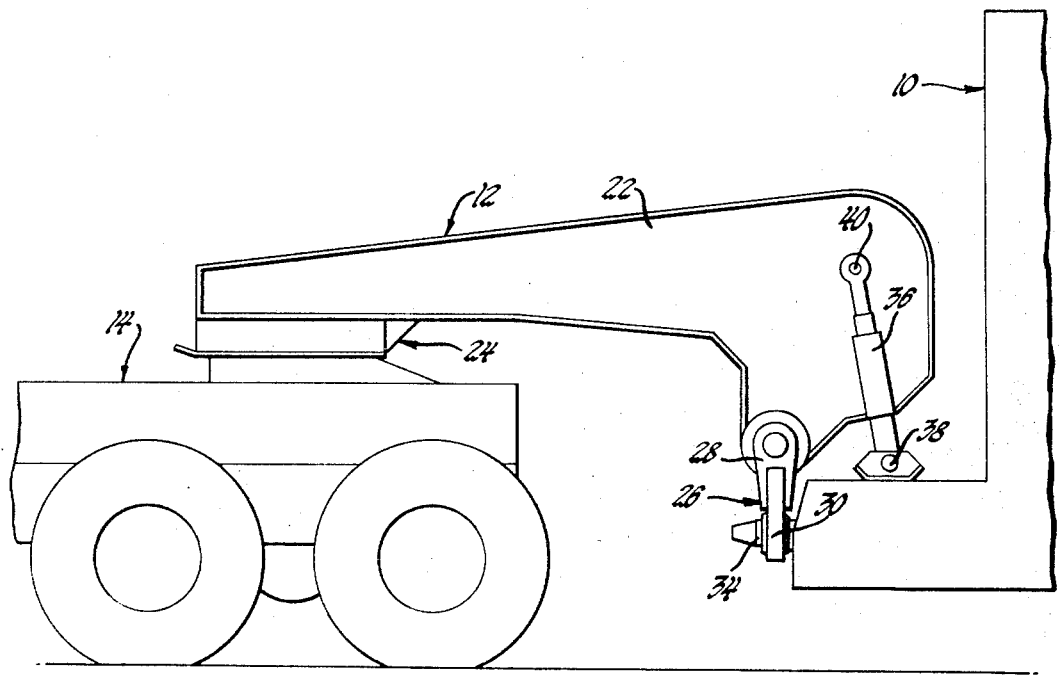
FIGURE 4 is an enlarged view showing the pull arm arrangement which connects the front end of the trailer with the tractor vehicle.

Referring now to the drawings and more particularly FIGURES 1 through 3, a trailer 10 is shown having its forward end connected through a pull arm arrangement 12 to the rear end of a partially shown tractor vehicle 14. The rear end of the trailer 10 is supported by a pair of laterally spaced suspension units 16 made in accordance with the invention. Each suspension unit 16 is located adjacent one side of the trailer 10 and includes a plurality of ground-engaging, rubber-tired wheels 18 rotatably supported by a walking beam 20. The suspension units 16 are identical in construction and therefore one unit only will be described in detail, it being understood that the other unit incorporates identical components.

The pull arm arrangement 12 cooperates with the suspension unit 16 for purposes of varying the height of the trailer 10 between two predetermined positions, one of which is shown in FIGURE 2 and the other in FIGURE 3. The adjustment in elevation of the trailer 10 and the unique suspension system employed with this device will be more readily understood after a consideration of the detailed description which follows of the various parts which make up the invention.

The pull arm arrangement 12 comprises a gooseneck member 22, the forward end of which is connected through a fifth wheel arrangement 24 to the tractor vehicle 14. The fifth wheel arrangement 24 provides for relative articulation between the members about a vertical axis and also for pivotal movement of the gooseneck member 22 about a transverse horizontal axis as shown in FIGURES 2 and 3. The lower rear end of the gooseneck member 22 is connected to the trailer 10 through a universal type connection 26 consisting of a pair of interconnected strap members 28 and 30 with the former being pivotally connected to the gooseneck at a point 32 while the latter is mounted to a spherical bearing 34 fixed with the trailer 10. A double-acting hydraulic actuator 36 has one end thereof supported on the trailer by a pivotal connection 38 while the other end is connected to the gooseneck by pivotal connection 40. Thus, it can be seen that expansion and contraction of the actuator 36 results in relative movement of the gooseneck member with respect to the trailer for purposes which will be more fully understood as the description of the invention proceeds.

Each suspension unit 16 has the walking beam 20 thereof connected to a lower body structure 41 of the trailer by a scissor-type mechanism composed of two pairs of identical link members 42, 44 and 46, 48. The respective pairs of link members are pivotally interconnected at points 50 and 52 and are also pivotally connected with the body structure and beam by pivot connections 54, 56 and 58, 60.

Figure 5:
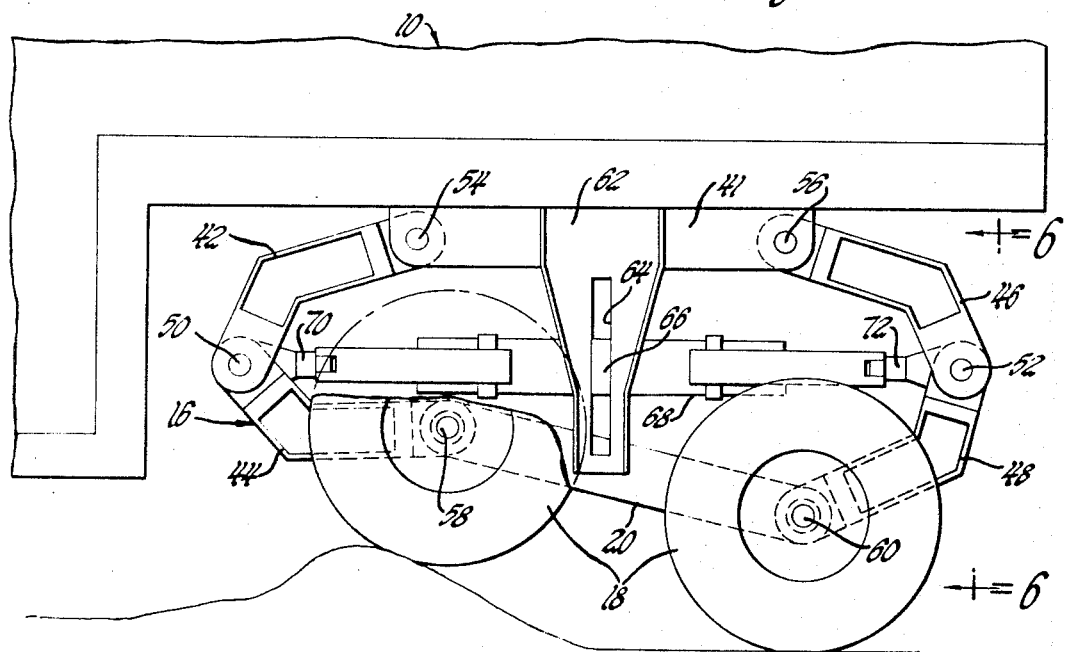
FIGURE 5 is an enlarged view of the suspension unit made in accordance with the invention and illustrates the relative positions assumed by the various link members when the trailer encounters uneven ground conditions.

As best seen in FIGURE 5, a rigid frame member 62 extends downwardly from the body structure 41 and has an elongated slot 64 formed therein. The slot 64 accommodates a guide block 66 rigidly secured to a double-acting, dual piston hydraulic actuator 68 having opposed piston rods 70 and 72 extending therefrom. The piston rod 70 is pivotally connected to the link members 42 and 44 at the common pivot connection 50 therebetween. Similarly, the piston rod 72 is pivotally connected to the other pair of link members 46 and 48 at their common pivot connection 52.

Thus, it should be apparent from the above description that when it is desired to raise the trailer 10 from the normal height position of FIGURE 1, this can be accomplished by simply contracting the actuator 68 incorporated with the suspension unit 16 and expanding the actuator 36 employed with the pull arm arrangement 12.

Through suitable hydraulic circuitry, it will be evident to one skilled in the art that the combined operation of the respective actuators will be such that the trailer 10 will be raised as well as lowered while maintaining a level position at all times. It should also be apparent that the actuators may be operated individually so that either end of the trailer 10 may be raised or lowered independent of the other end.

In order to lower the trailer 10 to a zero elevation or to ground level, the actuator 68 is expanded while at the same time contracting the forward actuator 36. During such movement the guide block 66 will move within its slot 64 from the lower position indicated in FIGURE 2 to the upper position indicated in FIGURE 3, while at the same time each pair of link members 42, 44 and 46, 48 will be collapsed toward each other resulting in a lowering of the rear end of the trailer.

One important feature of the suspension unit 16 incorporated with the trailer 10 is that the actuator 68 is restrained from all movement except along a vertical axis. This is because the guide block and slot connection precludes any axial movement of the actuator 68 and also prevents any twisting movement thereof about a horizontal axis. It will also be noted that this type of arrangement provides a rigid structure composed of the actuator 68 and the upper link members 42 and 46, while at the same time permitting oscillatory movement of the beam 20 which is supported by the lower link members 44 and 48. Accordingly, the wheels connected to the beam 20 are able to oscillate about a transverse horizontal axis and provide equal load-sharing capabilities as the vehicle encounters bumps in a road. This permits the trailer 10 to be utilized for off-highway purposes without detracting from the height adjustment capabilities of the suspension unit 16.

Figure 6:
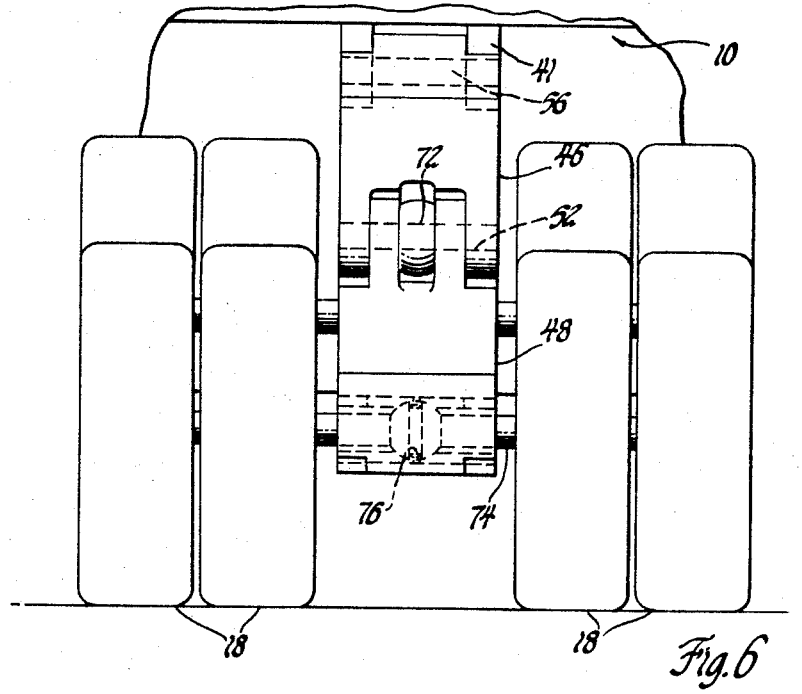
FIGURE 6 is a view taken on line 6—6 of FIGURE 5 showing in detail the manner in which the wheeled axle is supported by the suspension unit.
Figure 7:
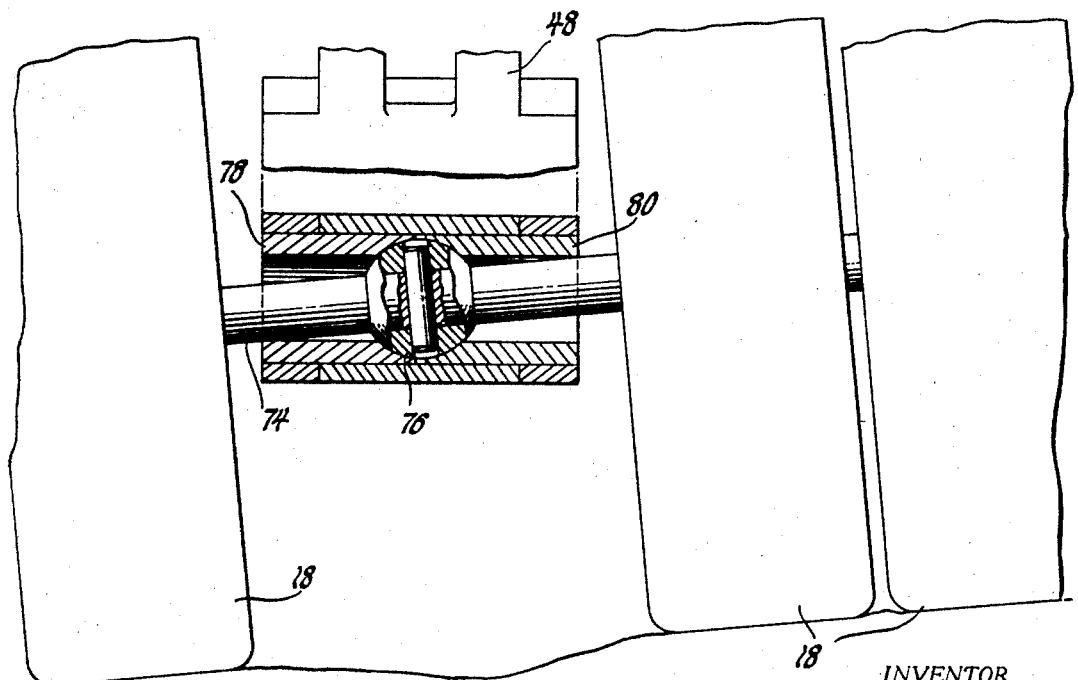
FIGURE 7 is an enlarged view of the wheeled axle of FIGURE 6 with parts broken away and showing the axle in a tilted position.

Another feature of this suspension unit 16 is the manner in which the front and rear wheels 18 are supported by the beam 20. In this regard, and as best seen in FIGURES 6 and 7, it will be noted that an axle 74 is provided at each pivotal connection 58 and 60 for rotatably supporting the dual wheels 18 at the opposite ends of the axle. A central portion of the axle 74 has a spherical bearing member 76 formed therewith which is supported for pivotal movement along a longitudinal axis by a pair of sleeves 78 and 80. Thus, the axle 74 is capable of oscillating about mutually perpendicular axes, one of which extends transversely and the other longitudinally of the trailer unit so the latter can readily operate over irregular terrain.

I claim:

1. A variable height suspension unit for a trailer having a body structure, said suspension unit comprising a wheeled walking beam, means including an extensible link connecting the fore and aft portions of the walking beam to said body structure, and means supporting a portion of said extensible link for vertical movement only and providing for vertical adjustment of said walking beam relative to said body structure and for oscillatory movement of said walking beam about a transverse horizontal axis.

2. The suspension unit of claim 1 wherein said first means comprises a pair of first link members having one end of each pivotally connected to said body structure, and a pair of second link members pivotally connected to the free ends of the first link members.

3. The suspension unit of claim 2 wherein the extensible link is connected to said first and second link members at the common pivot connection therebetween.

4. The suspension unit of claim 3 wherein said extensible link comprises a hydraulic cylinder having opposed piston members.

5. In combination a trailer adapted to be drawn by a tractor vehicle, said trailer having a body structure the forward end of which is connected to said tractor vehicle for relative articulation about a vertical steering axis and including an actuator for raising and lowering said forward end between set limits, the rear end of said body structure being supported by a suspension unit comprising a pair of first links, one end of said first links being pivotally connected to said body structure, a pair of second links pivotally connected to the other ends of said first links, a walking beam pivotally connected to the free ends of said second links and supporting a pair of axially spaced axles having wheels, an extensible link having the opposite ends thereof pivotally connected to said first and second links at the common pivot connection therebetween, and means providing for vertical movement of an intermediate portion of said extensible link but restricting axial movement thereof whereby expansion of said extensible link causes the walking beam to move toward the body structure and contraction of said extensible link results in said walking beam being moved away from said body structure.

6. The combination of claim 5 wherein said extensible link comprises a hydraulic cylinder having opposed piston members.

7. The combination of claim 5 wherein said body structure includes a rigid frame member formed with an elongated slot, and said extensible link comprises a rigid guide block located in said slot for movement along a vertical axis.

8. The combination of claim 5 wherein the pivotal conncetions of said second links with said walking beam are axially spaced and located at the axis of wheel rotation.

9. The combination of claim 5 wherein each of the axles is supported by the walking beam for oscillatory movement about an axis extending longitudinally of the trailer.

References Cited

UNITED STATES PATENTS

| 2,774,604 | 12/1956 | Rende et al. | 280—43.23 X |
| 2,835,502 | 5/1958 | Willetts | 280—43.23 X |
| 2,947,547 | 8/1960 | Gouirand | 280—43.23 |
| 3,147,023 | 9/1964 | Raymo | 280—43.23 |
| 3,240,506 | 3/1966 | McMullen | 280—43.23 |

LEO FRIAGLIA, *Primary Examiner.*

U.S. Cl. X.R.

280—43.23; 214—390; 280—104.5